United States Patent

[11] 3,574,252

[72] Inventors  Selwyn R. Rackoff
                Pittsburgh;
                Martin J. Dempsey, Bethel Park, Pa.
[21] Appl. No. 771,115
[22] Filed      Oct. 28, 1968
                Division of Ser. No. 692,785, Dec. 22, 1967,
                Pat. No. 3,435,499.
[45] Patented   Apr. 13, 1971
[73] Assignee   American Shear Knife Co.
                West Homestead, Pa.

[54] METHOD OF MAKING ROLL ASSEMBLY
     4 Claims, 7 Drawing Figs.
[52] U.S. Cl. .................................................. 29/148.4,
                                                              29/447
[51] Int. Cl. ................................................ B21d 53/12,
                              B21h 1/12, B21h 1/14, B21k 1/02, B21k 1/04
[50] Field of Search ........................................ 29/148.4
                                        (R), 447, (SKFT Digest), 125

[56]                    References Cited
                    UNITED STATES PATENTS
1,326,692  12/1919  Rogatchoff ................. (29/447UX)
1,955,728   4/1934  Allen et al. ................. (29/447UX)
1,980,156  11/1934  Emrick ...................... (29/SHFT Digest UX)
2,144,928   1/1939  Moncrieff .................. (29/SHFT Digest UX)
2,342,159   2/1944  Moran ....................... 29/148.4(R)X FOREIGN PATENTS
  423,518   2/1935  Great Britain .............. 29/447

Primary Examiner — Charlie T. Moon
Attorneys — Leonard H. Levenson and Hymen Diamond ABSTRACT: A tungsten-carbide roll assembly is made with the roll insert mounted on a mandrel. The insert has an inside diameter equal to the outside diameter of the mandrel and the mandrel is cooled to a low temperature and then the insert is slipped over it. When the mandrel rises to room temperature, the insert is firmly held without being excessively stressed. The insert is clamped firmly between the flange of the mandrel and a nut by screwing the nut on with a spanner wrench which engages grooves in the nut. Slots coextensive with the grooves are then cut in the mandrel and a key is inserted in the grooves and slots.

PATENTED APR 13 1971

*INVENTORS*
SELWYN R. RACKOFF
MARTIN J. DEMPSEY

*Hymen Diamond*

ATTORNEY 3,574,252

METHOD OF MAKING ROLL ASSEMBLY

CROSS REFERENCE TO RELATED APPLICATION

This application is a division of application Ser. No. 692,785 filed Dec. 22, 1967, now U.S. Pat. No. 3,435,499, to Selwyn R. Rackoff and Martin J. Dempsey and assigned to American Shear Knife Co. of 501 West Seventh Ave., West Homestead, Penna., U.S.A.

BACKGROUND OF THE INVENTION

This invention relates to roll assemblies for reducing work by rolling with rolls of materials or metalloids of the tungsten carbide type and has particular relationship to the making of such assemblies. In the practice of this invention the assemblies are so made that the damage to the rolls during the making or during use of these assemblies is minimized.

The expression "of the tungsten carbide type" as used in this application means primarily tungsten carbide (WC) and its alloys. It also means other hard metalloids such as titanium carbide, molybdenum carbide, tantalum carbide, niobium carbide and numerous others including borides, silicides, nitrides, and the like, and their alloys. For an elaborate list of these metalloids reference is made to Goetzel U.S. Pat. No. 2,581,252, particularly column 6, beginning line 16.

In the interest of concreteness this invention is discussed in this application with reference to the rolling or reduction of billets to rod or rod to wire. The reduction of rod is carried out by oppositely engaging the reducing rolls of a pair of roll assemblies in reducing relationship with the rod while rotating the assemblies and advancing the rod.

Typically, steel is reduced to rod or wire of about 0.218-inch to 0.5625-inch diameter and the wire is delivered at the rate of 5,000 to 10,000 feet per minute (typically 8,500 F.P.M.) from a 25-stand system. In the high numbered stands (from the 17th) the roller assemblies rotate at about 1,600 revolutions per minute. The reducing rolls particularly in the advanced assemblies are of the tungsten carbide type. In each roll assembly including a roll of the tungsten carbide type, the roll is in the form of an annular insert and is mounted on a mandrel of steel, which is driven to produce the rolling operation. During the rolling operation the roll insert is subjected to enormous stresses and it is necessary that rotation of the insert relative to the mandrel be prevented.

In accordance with prior art practice the tungsten carbide roll is provided with precisely dimensioned keys which are locked to suppress relative rotation of the roll and mandrel. In addition the inside diameter of the roll is dimensioned substantially smaller than the outside diameter of the mandrel (so that there will be no relative movement in use). A high failure rate of rolls in these prior art assemblies has been experienced. In addition these prior art assemblies are difficult and costly to produce because of the precise dimensioning of the keys in tungsten carbide which is not readily worked. There is also a high failure rate of the rolls during production so that the production shrinkage is high.

It is an object of this invention to overcome the above-described disadvantages of the prior art roll assemblies, and to produce assemblies which shall be producible at a relatively lower cost than prior art assemblies and shall not fail at a high rate in the making or in use.

SUMMARY OF THE INVENTION

This invention arises from the realization that the high rate of failure of the rolls in prior art assemblies, both when they are made and later, is caused by the keys in the tungsten carbide inserts and by the manner in which the assemblies are made. The keys are in effect notched regions and their very presence in the rolls or roll inserts weakens the rolls. In addition the dimensioning of the inside diameter of the roll smaller than the outside diameter of the mandrel causes enormous tensional forces to be applied to the roll by the mandrel as it warms up during the making of the assembly and causes the roll to fail during making, or, in its weakened condition, shortly after the assembly is put into use. It is an object of this invention to provide a method of making a roll assembly in which the roll insert is a smooth annulus, not weakened by a keyway, but the assembly of the roll is accomplished in such a way that the roll insert shall not have a high rate of failure and shall not, when in use, move relative to the mandrel.

The parent of this application is directed to a roll assembly in which the roll is a smooth annulus but its lateral face or surface which engages the flange of the mandrel is roughened. The roughening is effected by securing or binding to this face a hard particled material, typically particles of the tungsten carbide type mixed with a brazing material such as copper. Typically the particles are of −30 to +20 mesh, but they may be smaller, even a powder. To roughen a lateral face of a roll insert the particles of tungsten carbide and brazing material are disposed on the surface and then the surface is raised to the sintering temperature of the carbide. This temperature exceeds the brazing temperature of the brazing material and the particles are joined to the surface both by sintering and brazing. Alternatively, the brazing material alone may serve to hold the particles on the surface.

In accordance with this invention the tensional forces which damage or disrupt the roll inserts are reduced by dimensioning the inside diameter of the insert and the outside diameter of the mandrel substantially equal. The mandrel is then cooled and the roll insert slipped over it and compressed by a pressure exerting 160 tons of force. A nut is then screwed onto the mandrel. The nut engages the remaining face of the insert and has grooves which are engaged by a spanner wrench and the wrench is turned to exert additional compressive force on the insert. The mandrel is then provided with additional grooves coextensive with the grooves in the nut to provide a keyway which serves in the use of the assembly.

The mandrel, nut and insert are coordinated in strength. The mandrel and nut are hardened typically, to 50 to 55 Rockewll-C hardness. The grooves in the mandrel may be cut out in various ways but are typically cut out by abrasive sawing. The keyways in the nut and mandrel have no effect on the strength of the roll insert, which is smooth, but the key in the nut and mandrel holds the roll assembly together as a rigid unit.

BRIEF DESCRIPTION OF THE DRAWINGS

For a better understanding of this invention, both as to its organization and as to its method of operation, together with additional objects and advantages thereof, reference is made to the following description, taken in connection with the accompanying drawings, in which.

DESCRIPTION OF PREFERRED EMBODIMENT

Figure 1:
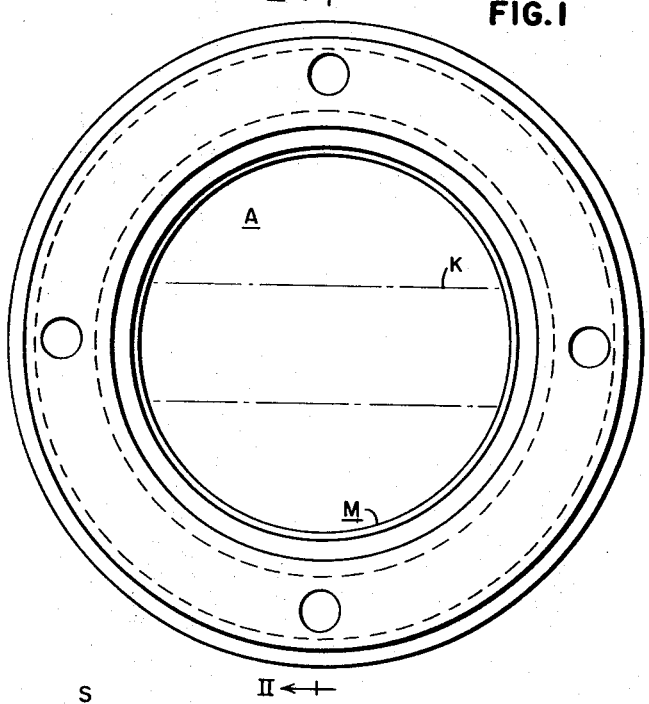
FIG. 1 is a plan view of a roll assembly produced in the practice of this invention.
Figure 5:
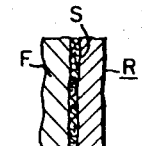
FIG. 5 is a fragmental view enlarged showing the relationship between the roll and the flange and the roughening interposed between the roll and flange.
Figure 3:
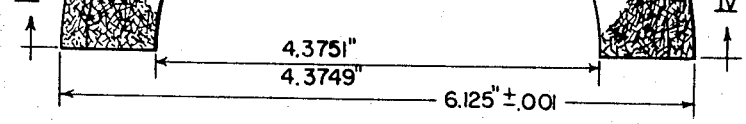
FIG. 3 is a plan view of the roll insert of the assembly shown in FIG. 1.
Figure 4:
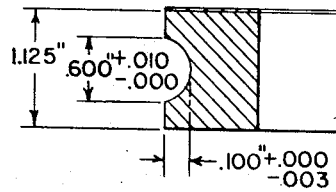
FIG. 4 is a view in section taken along line IV–IV of FIG. 3.

The apparatus shown in the drawings includes a roll assembly A having a mandrel M, a roll insert R of the tungsten carbide type and a nut N. The roll insert is held tightly, against relative rotation under the high stresses, between the nut N and the flange F of the mandrel M. In accordance with the parent application the surface of the carbide roll R is roughened and it engages the flange F. The roughening prevents rotation of the the roll R relative to the flange F or the mandrel M. The roughened surface S may typically by provided as follows:

A mixture of copper powder or particles (or other brazing material) and tungsten carbide powder or particles is deposited on the surface of the presintered roll to be roughened. The roll is then heated to the tungsten carbide sintering temperature which is higher than the brazing temperature for the copper. The tungsten carbide is brazed and sintered to the roll. In the sintering the cobalt of the roll material fuses to the tungsten carbide particles so that the particles become part of the roll surface. The tungsten carbide powder consists of small tetrahedra T (FIG. 5) which are sintered to the roll insert surface on their bases with their sharp apices outwardly.

Figure 2:
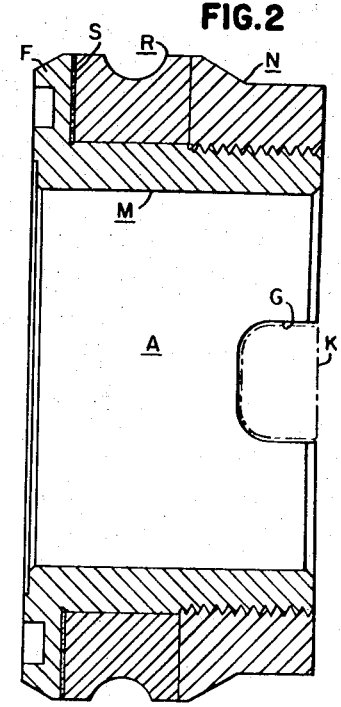
FIG. 2 is a view in section taken along line II–II of FIG. 1.
Figure 6:
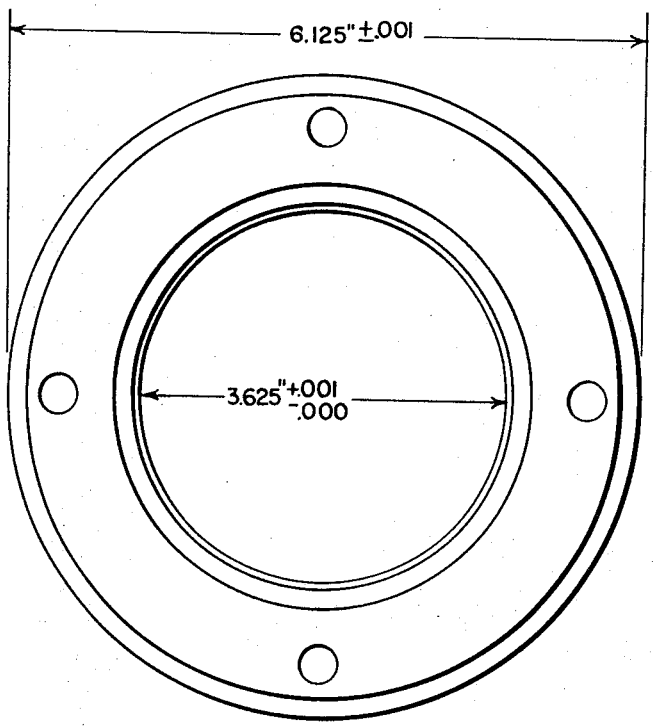
FIGS. 6 and 7 are views showing typical dimensions of the mandrel, and insert included, not with any intention of limiting this invention in any way, but with the purpose of aiding those skilled in the art to practice this invention.
Figure 7:
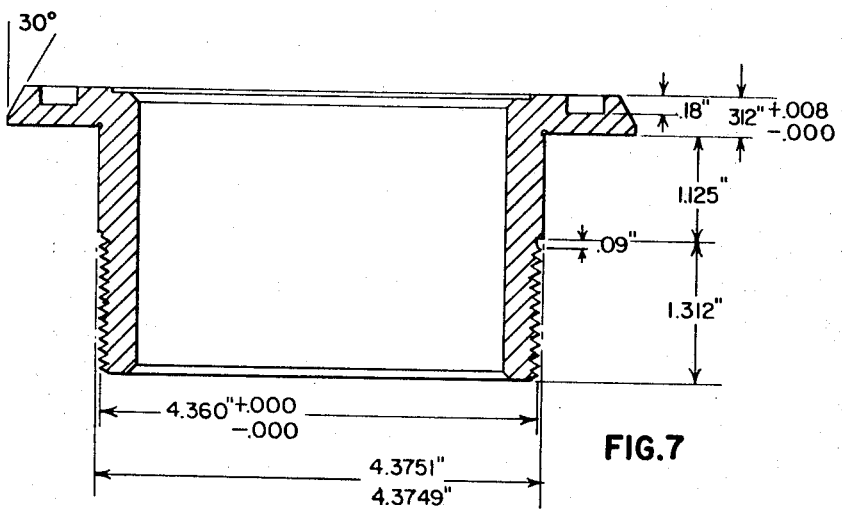

The mandrel M is composed of very hard tool steel. The outer diameter of the mandrel is dimensioned precisely (typically with ±0.0001 inches) equal to the inside diameter of the roll insert (compare FIGS. 6 and 7). The mandrel M is cooled to about −150° F. and the roll R is then slipped over the mandrel M. The roll R is then compressed onto the mandrel by applying about 160 tons force or higher (typically 300 tons) to the roll. The nut N is then screwed on and tightened by engaging a long spanner wrench in the grooves G (see FIGS. 1 and 2). Substantial compressive force is applied between the surfaces, S, of the roll R and flange F in this way. The portion of the mandrel M bounded by the grooves G is then sawed out by an abrasive saw and the slot through the grooves G and the adjacent portion of the mandrel M serves as a key slot in which a driving key K engages in the use of the apparatus. Movement of the nut N relative to the mandrel M is thus prevented. The equal dimensioning of the mandrel outside diameter and the roll inside diameter reduces the tensile stress to which the roll is subject during subsequent use, when the roll temperature at the work may be as high as 1,600° F. to 2,000° F., so that the roll failures are minimized.

We claim:

1. The method of producing a roll assembly including a roll insert of the tungsten carbide type mounted on a mandrel, while minimizing the tensional forces applied by the mandrel to the roll insert as the assembly becomes warm in use, which method comprises providing the inside surface of the insert and the outside surface of the mandrel, which inside and outside surfaces are smooth and are to be in engagement in the assembly with the outside surface encircling the inside surface, with substantially equal inside and outside diameters, respectively, cooling the mandrel only to a low temperature so that its outside diameter is reduced, and slipping the insert over the mandrel while the said outside diameter is so reduced, whereby the roll insert is held on the mandrel as the insert and the mandrel reach substantially the same temperature, and rotation under load of the insert relative to the mandrel is resisted, and providing additional resistance to rotation of the insert relative to the mandrel external to the engaging surfaces.

2. The method of claim 1 wherein the mandrel has a flange and the additional resistance to rotation is provided by engaging a lateral surface of the insert with said flange and bringing the insert into firm engagement with the flange by application between the insert and flange of high compressive stress.

3. The method of producing a roll assembly including a roll insert of the tungsten carbide type to be mounted on a mandrel having a flange, said insert to be held in firm engagement between the flange and a nut having a groove to be engaged by a spanner wrench, or the like, the said method comprising disposing said insert on said mandrel between said nut and flange, applying the spanner wrench to said groove to screw said nut on said mandrel to apply high compressive stress to said insert between said flange and nut, after said nut is so screwed onto said mandrel, cutting another groove into said mandrel coextensive with the groove in said nut, and inserting a key in said coextensive grooves to prevent rotation of the mandrel relative to the nut.

4. The method of producing a roll assembly including a roll insert of the tungsten carbide type mounted on a mandrel, and a nut, said mandrel having a flange, and said nut having a groove for engagement by a spanner wrench, the said method comprising providing the inside surface of the insert and the outside surface of the mandrel, which inside and outside surfaces are to be in engagement in the assembly with the outside surface encircling the inside surface, with substantially equal inside and outside diameters, respectively, cooling the mandrel only to a low temperature so that its outside diameter is reduced, slipping the insert over the mandrel while said outside diameter is so reduced to a position where one lateral surface of the insert engages said flange, bringing the insert into firm engagement with said flange by applying high compressive stress to the insert, engaging said nut with the other lateral surface of said insert under additional compressive stress by screwing said nut onto the mandrel with the aid of a spanner wrench, after said nut is screwed onto said mandrel, as aforesaid, cutting a groove, coextensive with the groove in said nut, into the mandrel and inserting a key in said grooves in said nut and mandrel to form a rigid assembly.